(12) United States Patent
Hassani et al.

(10) Patent No.: US 11,214,385 B2
(45) Date of Patent: Jan. 4, 2022

(54) SYSTEM AND METHOD FOR MONITORING AN AIRCRAFT DOOR OR OTHER COVERED OPENING

(71) Applicant: AEROSENS LLC, Pinecrest, FL (US)

(72) Inventors: Farid Hassani, Arlington, VA (US); Maria-Esther Martinez-Barreiro, Pinecrest, FL (US)

(73) Assignee: AEROSENS LLC, Pinecrest, FL (US)

( * ) Notice: Subject to any disclaimer, the term of this patent is extended or adjusted under 35 U.S.C. 154(b) by 0 days.

(21) Appl. No.: 16/707,138

(22) Filed: Dec. 9, 2019

(65) Prior Publication Data

US 2020/0148383 A1    May 14, 2020

Related U.S. Application Data

(63) Continuation-in-part of application No. 16/103,964, filed on Aug. 16, 2018, now Pat. No. 10,748,413.

(60) Provisional application No. 62/778,264, filed on Dec. 11, 2018, provisional application No. 62/546,684, filed on Aug. 17, 2017.

(51) Int. Cl.
    *B64D 45/00*    (2006.01)
    *G06Q 10/00*    (2012.01)
    *G07C 5/08*     (2006.01)

(52) U.S. Cl.
    CPC ......... *B64D 45/0005* (2013.01); *G06Q 10/20* (2013.01); *G07C 5/0841* (2013.01); *B64D 2045/0085* (2013.01)

(58) Field of Classification Search
    CPC .................................................. B64D 45/0005
    See application file for complete search history.

(56) References Cited

U.S. PATENT DOCUMENTS

| | | | |
|---|---|---|---|
| 7,135,976 B2 | 11/2006 | Neff et al. | |
| 7,825,803 B2 | 11/2010 | Neff et al. | |
| 8,548,547 B2 | 10/2013 | Vij | |
| 8,963,691 B1* | 2/2015 | Mitchell | H04Q 9/00 340/10.42 |
| 9,483,935 B2* | 11/2016 | Carlson | G07C 9/00182 |
| 9,511,879 B1* | 12/2016 | Lawrenz | B64D 45/0005 |
| 2007/0085677 A1 | 4/2007 | Neff et al. | |
| 2009/0108649 A1 | 4/2009 | Kneller et al. | |
| 2009/0309762 A1 | 12/2009 | Wölcken et al. | |
| 2012/0146815 A1 | 6/2012 | Yourkowski et al. | |
| 2016/0182170 A1* | 6/2016 | Daoura | H04H 20/59 455/3.01 |
| 2016/0297324 A1* | 10/2016 | Taylor | B60N 2/002 |
| 2017/0169675 A1* | 6/2017 | Burgess | G08B 13/08 |
| 2018/0298671 A1* | 10/2018 | Roppongi | E05D 15/0608 |
| 2019/0292839 A1* | 9/2019 | Kim | E05F 15/76 |

* cited by examiner

*Primary Examiner* — Mohamed Barakat
*Assistant Examiner* — Pameshanand Mahase
(74) *Attorney, Agent, or Firm* — Rabin & Berdo, P.C.

(57) ABSTRACT

A system includes an RF signaling device configured to record a count of a number of times that an aircraft door or cover has opened or closed, and a management device configured to determine a state of the aircraft door or cover based on communication with the RF signaling device.

17 Claims, 6 Drawing Sheets

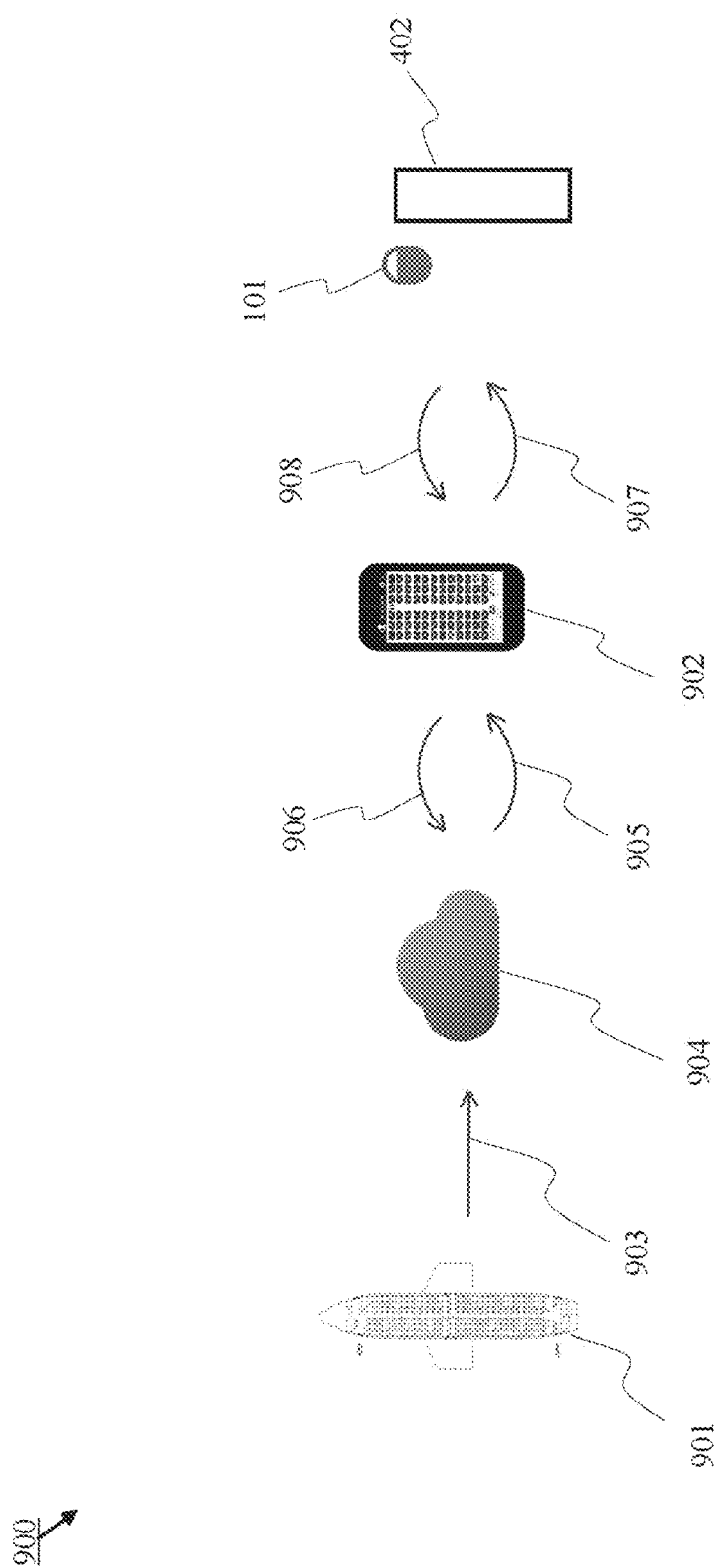

SYSTEM AND METHOD FOR MONITORING AN AIRCRAFT DOOR OR OTHER COVERED OPENING

CROSS-REFERENCE TO RELATED APPLICATIONS

This application claims the benefit of the earlier filing date of provisional application No. 62/778,264, filed Dec. 11, 2018. Further, this application is a continuation-in-part, and claims the benefit of the earlier filing date, of U.S. Ser. No. 16/103,964, filed Aug. 16, 2018 and claiming the benefit of the earlier filing date of provisional application No. 62/546,684, filed Aug. 17, 2017. Each of the noted applications is fully incorporated herein by reference.

TECHNICAL FIELD

This application relates generally to aircraft security and maintenance, and more specifically to a system and method for tracking whether an aircraft door, or other covered opening on an aircraft, is opened and/or closed, and counting a number of times that the aircraft door or other covered opening opens and/or closes.

BACKGROUND

Aircraft security and maintenance are crucial. Among other concerns related to aircraft security and maintenance are the possible tampering with and wear and tear of aircraft doors or other covers of openings of the aircraft, such as access panel covers, hatches, bin or compartment doors or lids or covers, and the like.

SUMMARY

This application relates to a system and method for facilitating security and maintenance of aircraft doors or other covers of openings of an aircraft. The system can include an RF (radio frequency) signaling device configured to monitor a state or condition of an aircraft door or other cover of an opening of an aircraft. In particular, the RF signaling device can detect opening and closing of the aircraft door or cover. The system can further include a management device configured to determine the state or condition of the aircraft door or cover based on communication with the RF signaling device. The method can include associating an RF signaling device with an aircraft door or cover, and monitoring a state or condition of the aircraft door or cover by using the management device to receive information from the RF signaling device. In particular, the RF signaling device can be configured to detect and report whether the aircraft door or cover has been opened and/or closed, and to count a number of times that the aircraft door or cover opens and/or closes and report the number of times to the management device. By monitoring the opening and closing of the aircraft doors or covers in this way, security and maintenance can be enhanced because damage to or tampering with, and wear and tear of, the aircraft doors or covers can be readily detected and accurately recorded.

BRIEF DESCRIPTION OF THE DRAWINGS

FIG. 6 shows another illustrative embodiment of a system for monitoring an aircraft door or cover.

DETAILED DESCRIPTION

In various non-limiting embodiments, a system and method as described herein can facilitate monitoring the opening and closing of an aircraft door or other covered opening on an aircraft. In the following, for brevity and clarity the term "aircraft door" is used; however, it is to be understood that the term "aircraft door" is not limited to doors for entry and exit of an aircraft by passengers and crew, but also covers any kind of door on an aircraft, such as a door to a cockpit or a restroom. Moreover, the following discussion also applies to any kind of cover for an opening on an aircraft, such as access panel covers, hatch doors, bin or compartment doors or lids or covers, and the like.

More specifically, the system can count the number of times that the aircraft door opens and/or closes ("and/or" as used herein means that the system can detect and count either the opening of the door, the closing of the door, or both the opening and closing of the door), record the count, and report the count to a management device. The system can include an RF (radio frequency) signaling device and a management device that communicate with each other.

The RF signaling device can be associated with the aircraft door and be configured to generate or output a signal or signals reporting on the state or condition of the aircraft door. By generating or outputting the signal or signals, the RF signaling device can register or report or otherwise provide notification of an event that occurs in connection with the aircraft door. The event can be, for example, the opening and/or closing of the aircraft door. Another example of the event is the count of the number of times that the aircraft door has opened and/or closed having increased by, or having reached, a particular value. Reaching a particular threshold value can indicate, for example, that maintenance should be performed on the door.

The management device can be configured to receive the signal generated by the RF signaling device and generate at least one of a visible or audible notification in response to the signal. To this end, the management device can include a processor configured to perform operations in response to the signal, and a display device coupled to the processor and configured to, under control of the processor, display information corresponding to the signal.

The RF signaling device can be configured to generate or output a signal or signals in response to a request or query or interrogation by the management device, or independently of interrogation by the management device. Either independently or in response to the interrogation, the RF signaling device can output a signal or signals indicating the count of the number of times that the aircraft door has opened and/or closed.

Figure 1:
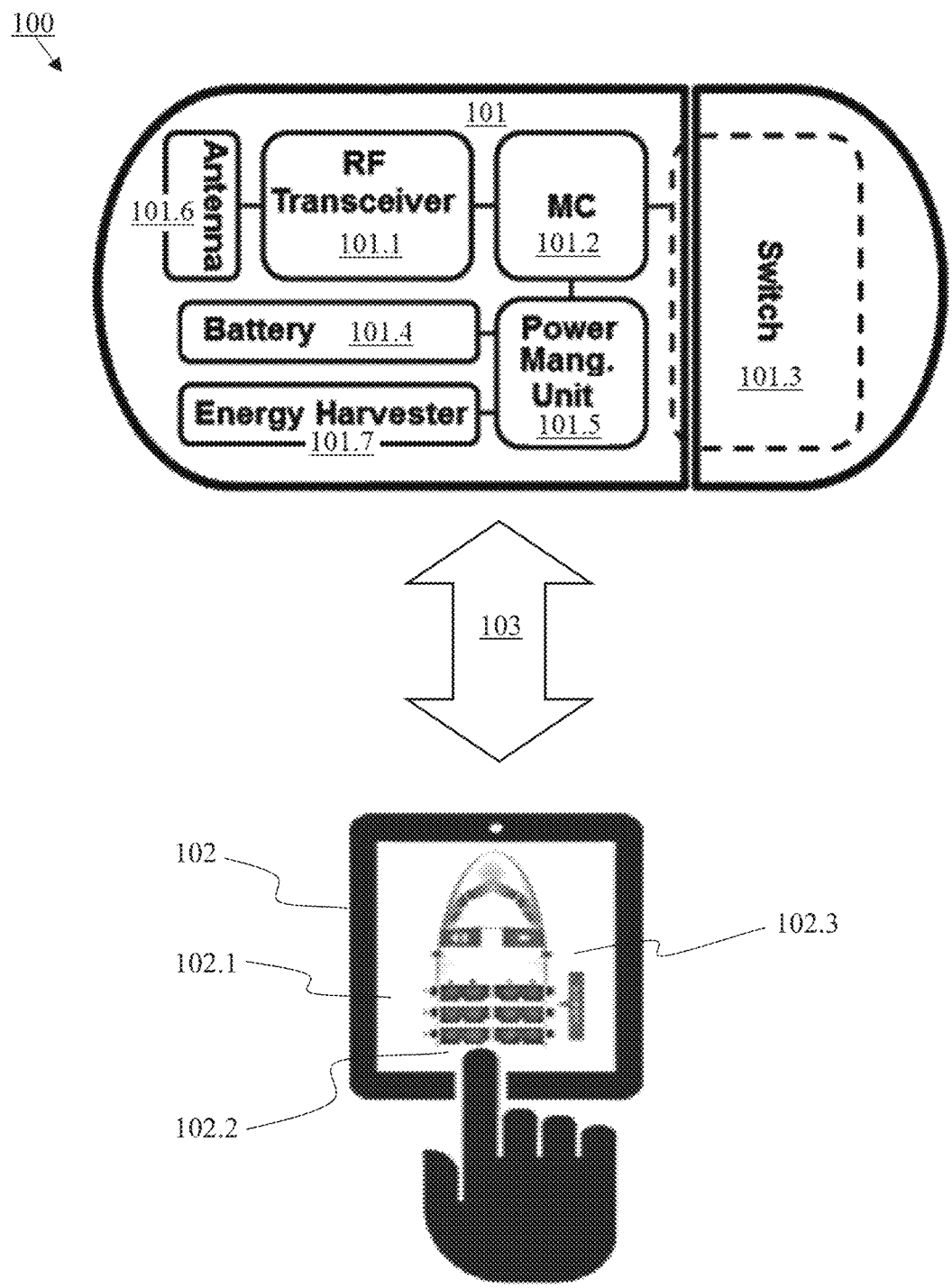
FIG. 1 shows an illustrative embodiment of a system for monitoring an aircraft door or cover.

Referring to FIG. 1, a system 100 for monitoring an aircraft door can include an RF signaling device 101 and a management device 102. The RF signaling device 101 can be or include, for example, an "RF tag" or "RFID tag" ("radio frequency identification tag"), which is a known, commercially-available product. The RF signaling device 101 can include an RF transceiver 101.1 configured to modulate and demodulate RF signals (e.g. in wireless technologies such as Bluetooth™, WiFi, and the ZigBee protocol), coupled to an antenna 101.6 configured to transmit and receive the RF signals. The RF signaling device 101 can further include a battery 101.4 configured to provide power to the RF signaling device 101, and an energy harvester 101.7 configured to harvest ambient energy, such as RF energy, kinetic energy (e.g., vibration), thermal energy or solar energy, to supplement the power provided by the battery 101.4. The battery 101.4 and the energy harvester 101.7 can each be coupled to a power management unit 101.5 configured to manage and optimize power usage by the RF signaling device 101, by controlling aspects of the operations of the battery 101.4 and the energy harvester 101.7. The RF transceiver 101.1 and power management unit 101.5 can each be coupled to a controller (or microcontroller) 101.2 configured to control operations of the RF transceiver 101.1, the antenna 101.6, the power management unit 101.5, the battery 101.4 and the energy harvester 101.7.

In non-limiting embodiments, the RF signaling device 101 can use, for example, Bluetooth™ Low Energy (BLE) technology. An operating frequency of the RF signaling device 101 can be, for example, approximately 2.402-2.480 GHz, and an operating temperature of the RF signaling device 101 can be, for example, between −20° C. and +70° C. Dimensions of the RF signaling device 101 can be, for example, 45×34×14 mm or 1.8×1.4×0.6 in. The RF signaling device 101 can weigh, for example, 20 grams or 0.04 pounds (battery included). A housing material of the RF signaling device 101 can be, for example, ABS plastic. The RF signaling device can, for example, use one coin-cell battery and have 4 dBm output power. The BLE technology can have −93 dBm sensitivity.

The controller 101.2 can further be coupled to a detection device, such as a switch 101.3. The switch 101.3 can be, e.g., a magnetic or mechanical switch. The switch 101.3 can be configured to detect an occurrence of an event, as described above, in connection with an aircraft door associated with the RF signaling device 101. For example, the switch 101.3 can assume one of an off state or an on state based on or in response to the aircraft door being opened and/or closed. The controller 101.2 can receive a signal from the switch 101.3 indicating the state or condition of the switch 101.3 and can perform operations in response to the signal. Specifically, for example, in response to the detection device 101.3 detecting that the aircraft door has opened and/or closed, the controller 101.2 can increment a counter that stores a count of the number of times that the aircraft door has opened and/or closed. The controller 102.2 can further cause the count to be reported to a management device.

To this end, the RF signaling device 101 can transmit and receive information 103 under control of the controller 101.2. For example, the RF signaling device 101 can transmit information 103 to, and receive information 103 from, a management device 102. The information 103 can be in the form of modulated electromagnetic radiation transmitted by the RF transceiver 101.1 and the antenna 101.6 in response to control signals from the controller 101.2, or modulated electromagnetic radiation received by the antenna 101.6, and processed and interpreted by the RF transceiver 101.1 and the controller 101.2.

The management device 102 can include a display device 102.1 configured to generate display information 102.3 including any one of, or a combination of, images and text. The management device 102 can further include an input device 102.2 configured to receive input from a user to control operations performed by the management device 102. The input device 102.2 can include any kind of device or interface for communicating user input to the management device, such as but not limited to a touch-sensitive display screen, a keyboard, voice-activated control or the like. The management device 102 can be or include, for example, a smartphone, a tablet or other handheld device having a graphical user interface for interactive user control of the management device 102.

Figure 2:
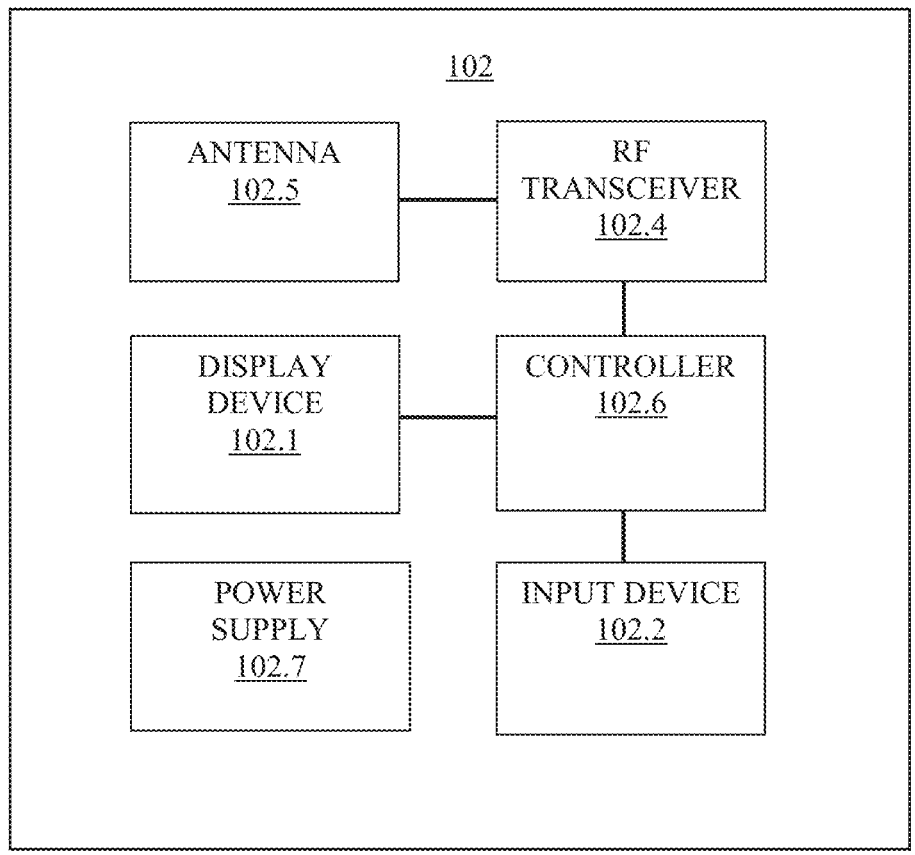
FIG. 2 is a block diagram showing components of a management device of the system.

FIG. 2 shows a functional block diagram of the management device 102. As shown in FIG. 2, the management device 102 can include a communication device such as an RF transceiver 102.4 coupled to an antenna 102.5. The RF transceiver 102.4 and the antenna 102.5 can be configured to transmit and receive radio waves. The RF transceiver 102.4 and the display device 102.1 can be coupled to a controller 102.6. The controller 102.6 can be coupled to the input device 102.2 and be configured to perform operations in response to user input received by way of the input device 102.2. A power supply 102.7 of the management device 102 can provide power to the management device 102.

Figure 3:
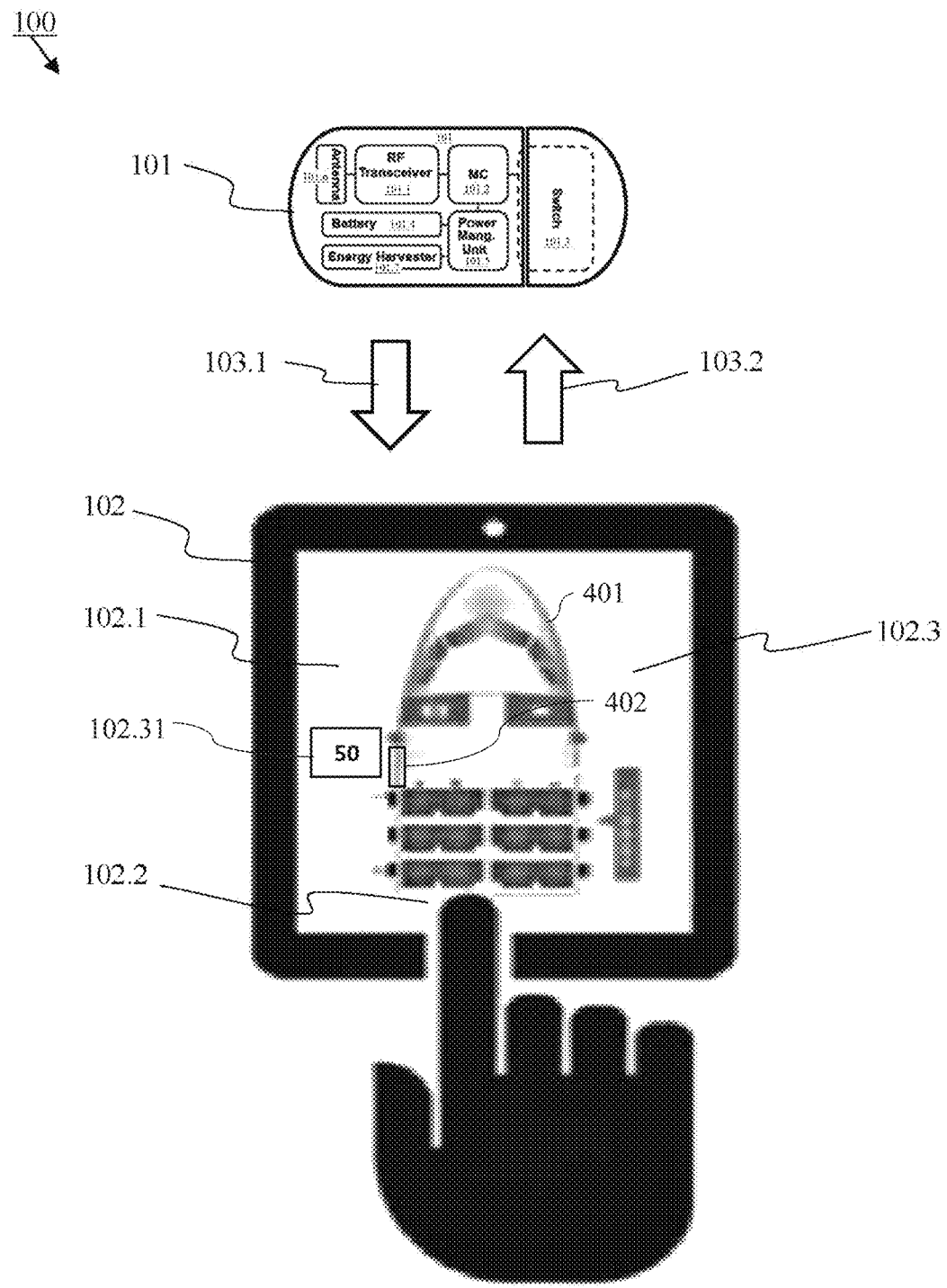
FIGS. 3 and 4 show additional views of the system.
Figure 4:
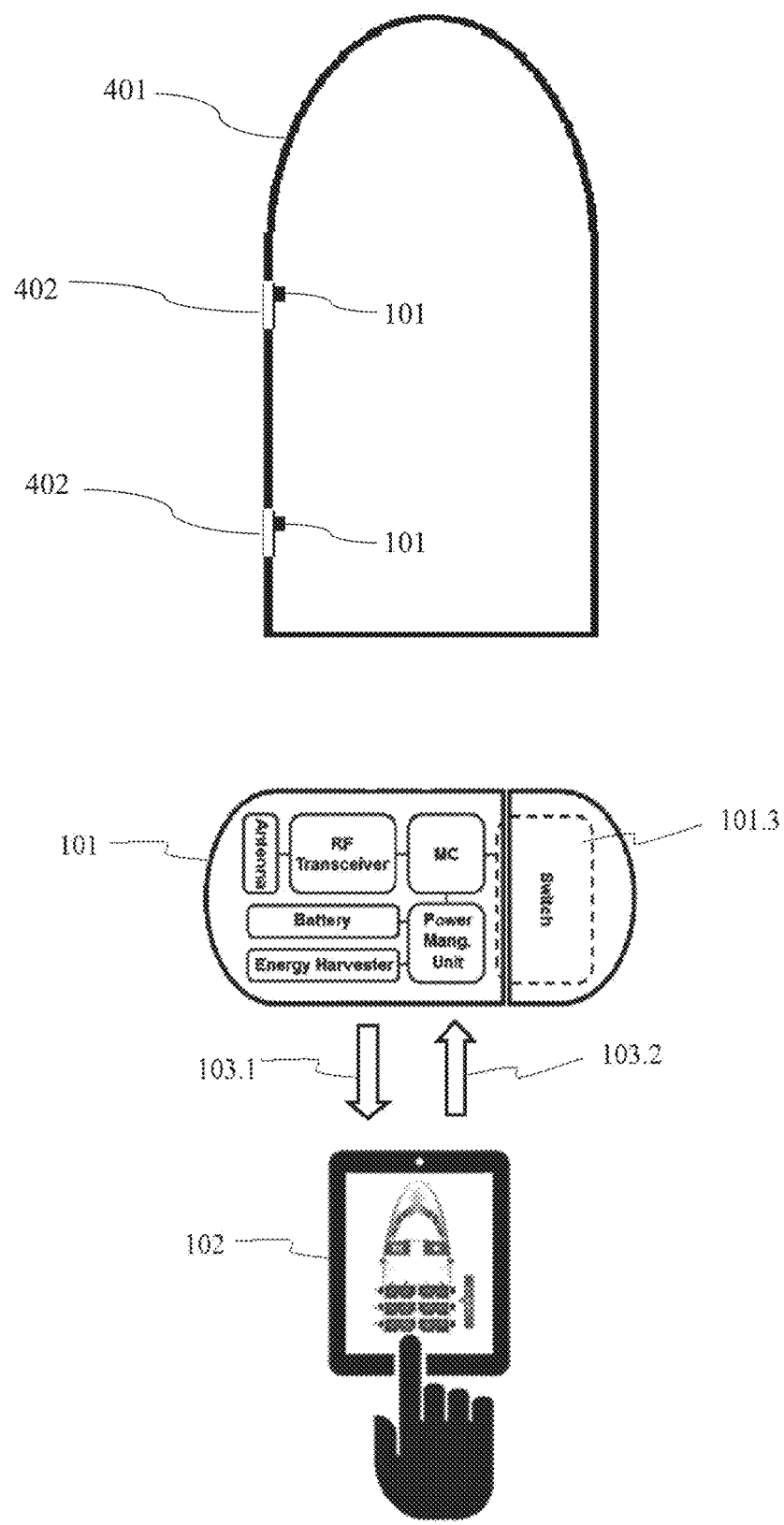

FIGS. 3 and 4 show additional views of the system 100. As shown in FIG. 3, the RF signaling device 101 can transmit a signal 103.1 to the management device 102. The signal 103.1 can include a unique identifier of the RF signaling device 101. In non-limiting embodiments, the unique identifier can include a MAC address of a Bluetooth™ device. The MAC address can include a status counter, a firmware version and a battery status. The signal 103.1 can further include information indicating a count of the number of times that the aircraft door associated with the RF signaling device 101 has been opened and/or closed. The controller 102.6 of the management device 102 can be configured to process the information to determine the state of an aircraft door associated with the RF signaling device 101.

More specifically, the management device 102 can receive the signal 103.1 and perform an operation in response. For example, the controller 102.6 of the management device 102 can be configured to, in response to the signal 103.1, process information in the signal 103.1 and perform operations to cause the display device 102.1 to generate display information 102.3 corresponding to the information. For example, the display information 102.3 can be caused to display the count 102.31 of the number of times that the aircraft door 402 associated with the RF signaling device 101 has been opened and/or closed.

The management device 102 can transmit a signal 103.2 to the RF signaling device 101. The signal 103.2 can include an interrogation signal that requests that the RF signaling device 101 respond with its current state or condition and other information, such as the count of the number of times that the aircraft door 402 associated with the RF signaling device 101 has been opened and/or closed.

The display information 102.3 can include an image representing an aircraft 401 having at least one door 402. The display information 102.3 can further represent a location of an RF signaling device 101 and an associated aircraft door 402 of the aircraft 401, as shown in a larger scale in FIG. 4. For example, the display information 102.3 can include graphical representations, e.g., shapes and colors.

The management device 102 can be configured to receive user input by way of the input device 102.2. For example, in response to the user input, the controller 102.6 can perform operations to cause the RF transceiver 102.4 and the RF antenna 102.5 to transmit the signal 103.2 to interrogate each of a plurality of RF signaling devices 101 to determine their states. In response, one or more RF signaling devices 101 associated with respective aircraft doors 301.1 can each transmit the signal or signals 103.1 to the management device 102. In response to the signal or signals 103.1 the controller 102.6 can perform operations to cause the display information 102.3 to be updated to display the count 102.31 of the number of times that an associated aircraft door 402 has been opened and/or closed. In the non-limiting example of FIG. 3, the count 102.31 shows that the aircraft door 402 has been opened and/or closed 50 times.

As shown in FIG. 4, the RF signaling device 101 can be associated with (e.g., coupled or connected or fastened or affixed to) one or more aircraft doors 402 of the aircraft 401. After the RF signaling device 101 is associated with an aircraft door 402, the management device 102 can be used to track the opening and closing of the aircraft door 402 by communicating with its associated RF signaling device 101. For example, as discussed above, in response to user input, the management device 102 can interrogate the RF signaling device 101 to determine its state, such as a current value of a counter storing the number of time the associated aircraft door 402 has been opened and/or closed. The management device 102 can be used to track and monitor a plurality of RF signaling devices 101, each associated with an aircraft door 402.

In response to the interrogation by the management device 102, each RF signaling device 101 can transmit a signal or signals indicating information about an associated aircraft door 402. The management device 102 can receive the signals and update its display accordingly.

The RF signaling device 101 need not transmit the signal to indicate the information about the aircraft door 402 only in response to interrogation by the management device 102. Instead, the RF signaling device 101 can continually or periodically transmit the signal indicating the information about the aircraft door 402 independently of the interrogation, and the management device 102 or other monitoring device can be configured to continually or periodically perform an operation, such as polling, to detect a change in the information.

The information about the aircraft door 402 associated with the RF signaling device 101 can be collected, for example, by an operation of the switch 101.3. The switch 101.3 can, in response to manipulation of the door 402, change in state from off to on, or from on to off. The change in state of the switch 101.3 can be caused, for example, by a break or interruption in electrical contact of the switch 101.3 with a main body of the RF signaling device 101 due to opening and/or closing of the door 402. In response to the change in state of the switch 101.3, the controller 101.2 can perform an operation to cause a count of the number of times that the aircraft door has been opened and/or closed to be incremented in a memory. The memory can be a component of the controller 101.2, for example, or can be external to the controller 101.2.

Figure 5:
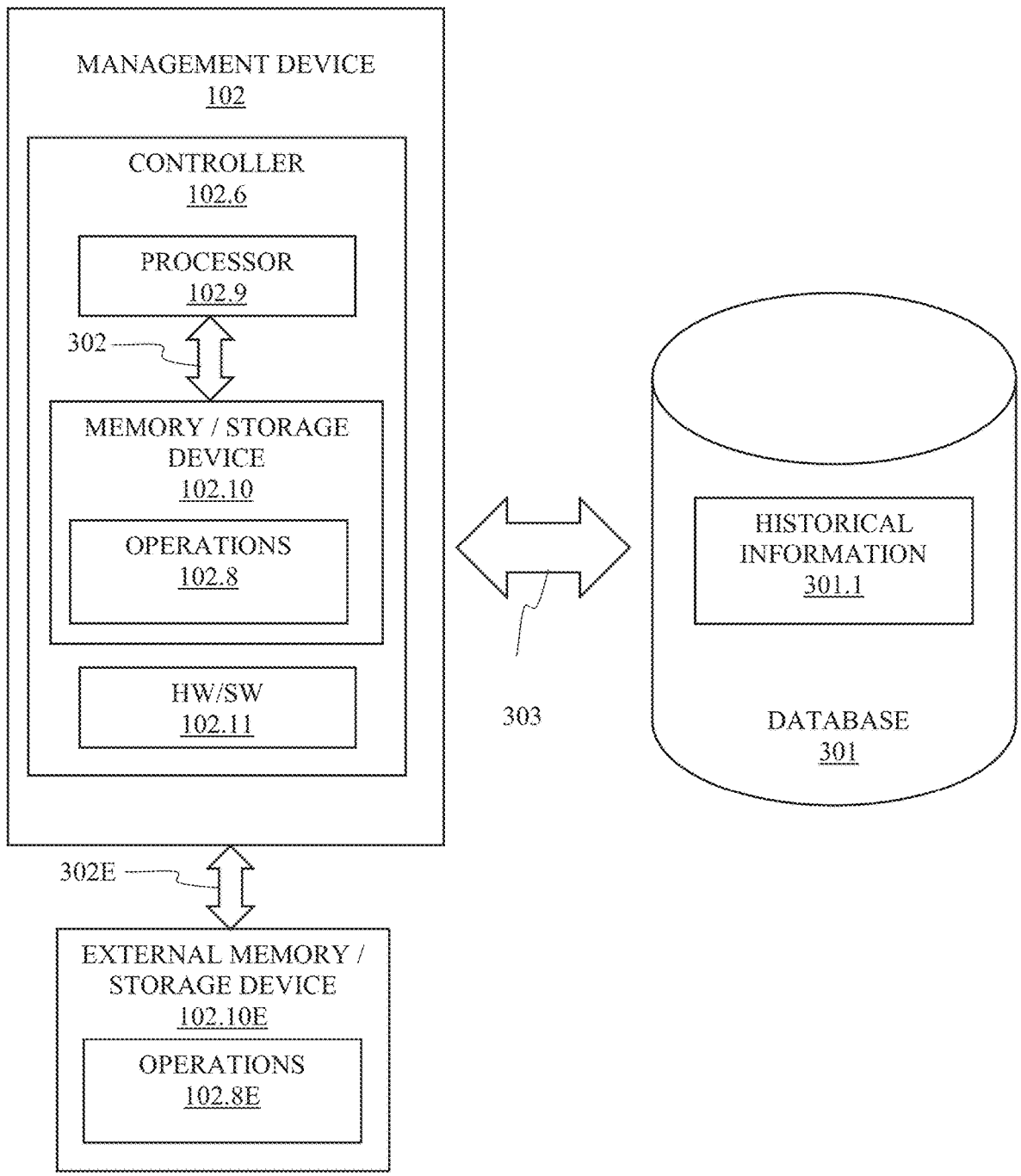
FIG. 5 is another block diagram showing components of the management device.

Referring to FIG. 5, the controller 102.6 of the management device 102 can include a processor 102.9 and a memory or other electronic storage device 102.10. The memory/storage device 102.10 can store operations 102.8. The processor 102.9 can communicate via signals 302 with the memory/storage device 102.10 to perform the operations 102.8 to implement the methods and operations described herein. The processor 102.9 can include, for example, a general-purpose CPU (central processing unit) configured to fetch and execute instructions, corresponding to operations 102.8, stored in the memory 102.10 to implement the methods and processes. Additionally, or alternatively, the controller 102.6 can include any other hardware, firmware or software combinations 102.11 configured or configurable to carry out the methods and processes, such as one or more ASICs (application-specific integrated circuits) configured to carry out the methods and processes. In light of the foregoing, the term "processor" as used herein is intended to encompass standalone processors, as distinct from memory, as well as the combination of a processor and a memory, typically referred to as a computer, as well as any other hardware, firmware or software combinations configured or configurable to carry out the methods and processes described herein. The memory/storage device 102.10 can include any kind of machine-readable medium configurable to store information electronically, such as RAM (random access memory) or ROM (read-only memory). The management device 102 can communicate with a memory/storage device 102.10 internal to the management device 102 or the controller 102.6 but is not limited in this regard. The management device 102 can also communicate, for example, via signals 302E with an external memory/storage device 102.10E storing processor-executable operations 102.8E to carry out the methods and processes described herein. The memory/storage device 102.10 and the external memory/storage device 102.10E can include any kind of machine or computer-readable media. Examples of machine/computer-readable storage media include, but are not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store information electronically and which can be accessed by a processor or computer.

The management device 102 can communicate with a database 301 external to the management device 102 by electronically exchanging signals 303 with the database 301. The database 301 can be a machine/computer-readable storage medium along the lines described previously. The database 301 can store historical information 301.1. The historical information 301.1 can include information collected over a period of time concerning RF signaling devices 101 and their associated aircraft doors 402. In response to a request from the management device 102, the database 301 can provide the historical information 301.1 to the management device 102. Further, the management device 102 can write or update or otherwise record new or changed historical information 301.1 to the database 301 at various intervals of time, thus collecting historical information regarding the RF signaling devices 101 and their associated aircraft doors 402.

FIG. 6 illustrates another non-limiting embodiment 900. System 900 can include aircraft information 901. The aircraft information 901 can include LOPA (Layout of Passenger Accommodations) information, for example. LOPA information can include an engineering diagram of an aircraft's cabin interior indicating, for example, locations of passenger and flight attendant seats, emergency equipment, doors, lavatories, and galleys. The aircraft information 901 can further include such information as aircraft number, seat location information such as row number and seat letter, and all related personal safety equipment information such as manufacturer, part number, serial number, expiry date, and unique identifier for equipment. The aircraft information 901 can be in CSV (comma separated file) format, for example.

The aircraft information 901 can be uploaded 903 to a network 904 of interconnected servers accessible through a telecommunications system. Such a network can be referred to as "the cloud," and can be or include, for example, the Internet or World Wide Web. A server or servers, and associated storage devices, of the network or cloud 904 can be or include one non-limiting embodiment of the database 301 discussed previously in connection with FIG. 5. The aircraft information 901 can be downloadable to a mobile device 902 such as a smartphone configured to function as a management device 102 (i.e. the mobile device 902 can be one non-limiting embodiment of the management device 102). The mobile device 902 can include application software that performs operations based on or using the aircraft information 901. The application software can be one non-limiting embodiment of the operations 102.8 or 102.8E discussed previously in connection with FIG. 5.

The mobile device 902 can connect to the network/cloud 904 and download 905 the aircraft information 901 to the mobile device 902. The aircraft information 901 can include a list or lists of aircraft by number, for example. Via an interface of the mobile device 902, an aircraft identifier, such as a number, can be selectable by a user. In response to the selection, the application software of the mobile device 902 can download 905 information 901 from the network/cloud 904 for the specific aircraft corresponding to the selection. The downloaded information 901 can be cached on the mobile device 902.

The application software of the mobile device 902 can generate a display on the mobile device 902 corresponding to the downloaded information 901. In generating the display, the application software can process the information 901 to, for example, recognize or determine such information as a number of times that each of doors 402 on the specific aircraft has been opened and/or closed. Based on processing of the downloaded information 901, the application software can generate a display to be presented on a screen of the mobile device 902. The display can correspond to a physical layout of the selected aircraft.

The application software can execute operations to cause the mobile device 902 to interrogate 907 RF signaling devices 101 assumed to be present in the interior of an aircraft and associated with respective aircraft doors. Each RF signaling device 101 can respond 908 to the interrogation 907 by the mobile device 902 with information including the number of times an associated door 402 has been opened and/or closed. The interrogation 907 and response 908 can correspond to signals 103.2 and 103.1, respectively, discussed previously in connection with FIG. 3. Based on the response 908 received by the mobile device 902 from each RF signaling device 101, a display of the mobile device 901 can be updated.

The data files collected by the interrogation can be uploaded 906 by the application software executing on the mobile device 902 to the network/cloud 904, where any authorized user can easily and conveniently access the data files to quickly determine the status of the doors on any selected aircraft. The download 905 and the upload 906 can correspond to signals 303 discussed previously in connection with FIG. 5.

It should be understood that there is no limitation as to time, location or environment in the various embodiments described herein. That is, the embodiments disclosed herein can function/operate at any time or in any place. More specifically, for example, the embodiments can function/operate while an aircraft equipped with the embodiments is on the ground, or taking off, or in flight, or landing.

It will be understood that the foregoing description is provided for illustration only, and not for limitation of the appended claims and their equivalents. It will further be understood that the above-described exemplary embodiments are susceptible to various modifications, changes and adaptations, and the same are intended to be comprehended within the meaning and range of equivalents of the appended claims.

What is claimed is:

1. A system, comprising:
   an RFID tag configured to record a count of a number of times that an aircraft door or cover has opened or closed; and
   a management device configured to determine a state of the aircraft door or cover based on communication with the RFID tag;
   wherein the RFID tag includes a magnetic switch configured to assume one of an off state or an on state in response to a break or interruption in electrical contact of the magnetic switch with a main body of the RFID tag due to opening or closing of the aircraft door or cover.

2. The system of claim 1, wherein the RFID tag is configured to report the count of the number of times that the aircraft door or cover has opened or closed to the management device.

3. The system of claim 1, wherein the management device comprises:
   a communication device configured to receive information from the RFID tag; and
   a controller configured to process the received information to determine the state of the aircraft door or cover.

4. The system of claim 3, wherein the management device further comprises a display device configured to display information including the state of the aircraft door or cover.

5. The system of claim 4, wherein the displayed information includes the count of the number of times that the aircraft door or cover has been opened or closed.

6. A system, comprising:
   an RFID tag affixed to an aircraft door or cover; and
   a management device configured to communicate with the RFID tag;
   wherein the RFID tag is configured to report information including a count of a number of times that the aircraft door or cover has opened or closed; and
   wherein the management device comprises a processor configured to process the information reported by the RFID tag; and
   wherein the RFID tag includes a magnetic switch configured to assume one of an off state or an on state in response to a break or interruption in electrical contact of the magnetic switch with a main body of the RFID tag due to opening or closing of the aircraft door or cover.

7. The system of claim 6, wherein the management device further comprises:
   a display device configured to display the processed information, the processed information including a representation of the count of the number of times that the aircraft door or cover has opened or closed.

8. The system of claim 6, wherein the RFID tag includes a memory to store the count of the number of times that the aircraft door or cover has opened or closed.

9. The system of claim 6, wherein:
   the RFID tag is configured to modulate and demodulate RF signals using Bluetooth™ Low Energy (BLE) technology; and
   the RFID tag further includes
   a battery configured to provide power to the RFID tag,
   an energy harvester configured to supplement the power provided by the battery, and a power management unit configured to manage and optimize power usage by the RFID tag by controlling operations of the battery and the energy harvester, wherein the power management unit is configured to control the RFID tag to have up to 4 dBm output power.

10. A method, comprising:

by an RFID tag, in response to opening or closing of an aircraft door or cover associated with the RFID tag, updating a count of a number of times that the aircraft door or cover has opened or closed; and reporting, by the RFID tag, the count of the number of times that the associated aircraft door or cover has opened or closed to a management device;

wherein the updating of the count of the number of times that the aircraft door or cover has opened or closed is in response to a magnetic switch of the RFID tag assuming one of an off state or an on state in response to a break or interruption in electrical contact of the magnetic switch with a main body of the RFID tag due to opening or closing of the aircraft door or cover.

11. The method of claim 10, further comprising:

by the management device, receiving the count of the number of times that the associated aircraft door or cover has opened or closed; and based on the received count, updating information concerning a state of the associated aircraft door or cover.

12. The method of claim 11, the updating the information concerning the aircraft door or cover including displaying the count of the number of times that the aircraft door or cover has opened or closed.

13. The method of claim 10, further comprising:

by the management device, interrogating the RFID tag to determine the count of the number of times that the aircraft door or cover has opened or closed.

14. The method of claim 10, further comprising:

by the RFID tag, reporting to the management device that the count of the number of times that the aircraft door or cover has opened or closed has reached a threshold value.

15. A method, comprising:

counting, by an RFID tag, a number of times that an aircraft door or cover has opened or closed, based on a magnetic switch of the RFID tag assuming one of an off state or an on state in response to a break or interruption in electrical contact of the magnetic switch with a main body of the RFID tag due to opening or closing of the aircraft door or cover;

receiving, by a mobile device, signals from the RFID tag corresponding to the counting; and displaying, by the mobile device, a representation of the aircraft door or cover together with the count of the number of times that the aircraft door or cover has opened or closed.

16. The method of claim 15, further comprising storing a record of the count in a database.

17. A non-transitory machine-readable medium storing processor-executable instructions configured to perform the method of claim 15.

* * * * *